A. P. ANDERSON.
ART OF TREATING STARCH AND STARCH MATERIALS, AND PRODUCT.
APPLICATION FILED AUG. 31, 1906.
1,035,829.
Patented Aug. 20, 1912.
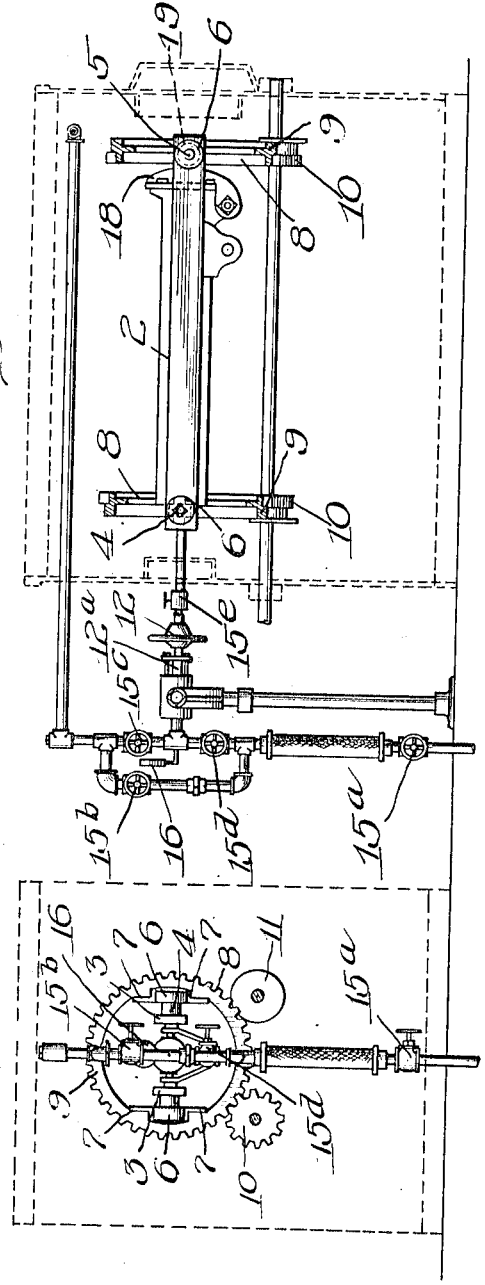
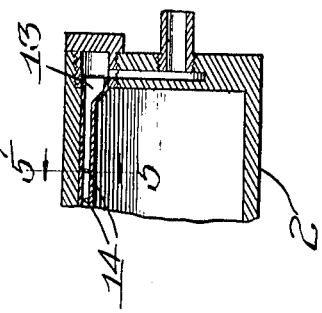
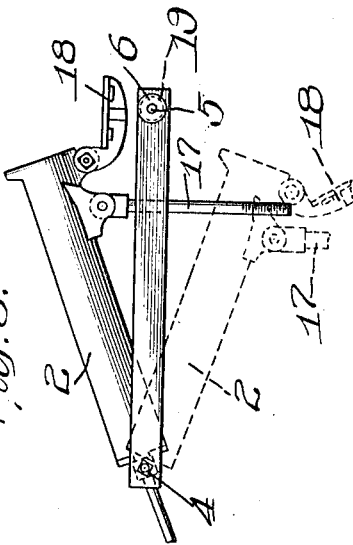
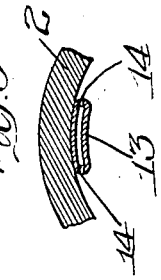
Witnesses:
Inventor:
Alexander P. Anderson
by Jones Addington
Attys:

UNITED STATES PATENT OFFICE.

ALEXANDER P. ANDERSON, OF CHICAGO, ILLINOIS.

ART OF TREATING STARCH AND STARCH MATERIALS, AND PRODUCT.

1,035,829.

Specification of Letters Patent. Patented Aug. 20, 1912.

Application filed August 31, 1906. Serial No. 332,804.

*To all whom it may concern:*

Be it known that I, ALEXANDER P. ANDERSON, a citizen of the United States, residing at Chicago, in the county of Cook and State of Illinois, have invented new and useful Improvements in the Art of Treating Starch and Starch Materials, and Product, of which the following is a full, clear, concise, and exact description, reference being had to the accompanying drawing, forming a part of this specification.

My invention relates to a new process for treating starch, and to a new product obtained thereby.
One object of my invention is to produce a simple, economical and rapid process of treating starch and starch-containing material in the pulverulent, powdered or lump-form to obtain a lump-product in the form of small pebble-like, nodular or ball-like lumps.

Another object is to produce a new lump-product preferably in the form of pebble, nodule or ball-like lumps from the pulverulent, powdered or lump-starch and starch-containing materials such as flours or the like, which new product possesses new and useful properties as hereinafter described.

A specific object of my present invention is to produce a more simple, economical and rapid process of making lump-starch from the powdered, pulverulent or ordinary lump-starch than heretofore known, and also to produce a new and novel lump-starch product preferably in a pebble, nodule or ball-like form which possesses many novel and advantageous characteristics as compared with other lump-starch products, as will more fully appear from the detailed description and claims.

In carrying out my new process, the material is subjected to a treatment rendering the same somewhat sticky and adhesive, and also to what might properly be termed a tumbling action, whereby ball, nodule or pebble-like lumps are formed.

In the preferred manner of carrying out the process, I employ a rotatable drum, cylinder or other receptacle in which the material is treated, this being heated by some suitable source of heat and rotated in any desired manner. The material containing the desired amount of moisture is introduced into the drum, cylinder or receptacle, and is subjected to heat. At the same time the receptacle is rotated whereby the contained material is given a kind of tumbling action, so that it will form itself up into lumps resembling small balls, nodules or pebbles. The shape of these nodules or pebbles ordinarily is practically globular or ovoidal or flattened ovoidal. The size of the lumps, nodules or pebbles may vary also according to the treatment which they receive, from mere pellets of pin-head sizes to about the size of Lima beans and larger, if desired. The process thus broadly stated and the preferred manner of carrying it into effect are applicable to starch in the powdered, pulverulent or lump-form, and to starch-containing materials, such as flours and the like.

The new product thus obtained possesses new and useful characteristics, and in addition has individual features of novelty and value, due to the different materials employed and to such specific variations as may be desired in the particular processes following during treatment.

The present application contemplates the generic process and product thus described, and the specific application of the invention to the treatment of starch either in the powdered, pulverulent or lump-form, and the new product which we may term pebbled starch.

Other species of the generic invention are included in other applications filed contemporaneously.

By the term "starch-material" as herein used, I mean to include starch-containing materials such as flours of various kinds, as well as all kinds of starches.

While in the foregoing I have referred to this product as pebble-like, nodular or ball like, I regard these terms as synonymous in their application to this product, and, therefore, for the sake of brevity, I will hereinafter use the term pebble, pebble-like, etc.

Referring to the drawings, the figures illustrate one form of apparatus which may be used for carrying out the process.

In these drawings: Figure 1 is a side view of the piping together with a longitudinal sectional elevation of the drum-support in the oven, the latter being indicated in dotted lines; Fig. 2 is a rear end view of the arrangement shown in Fig. 1; Fig. 3 shows the drum in charging and discharging positions, the latter position being indicated in dotted lines; Fig. 4 is a sectional view of the rear end of the drum; and, Fig. 5 is a section of the drum on the line 5—5 of Fig. 4.

The raw material to be treated is put into a drum 2, mounted upon a suitable car capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted outside of the members 3, upon the projecting ends of trunnion 4 and shaft 5. The cars run on a track 7 within the oven, consisting of four rails fastened to the inside of the cage 8. At each end of the oven is a ring 9 having teeth outside forming a gear, which meshes with another gear 10 adapted to be connected to a suitable source of motive power. The gears 10 and rollers 11 support the cage and inclosed drum, in addition to causing rotation thereof by any suitable power applied to one of their supporting shafts outside of the oven. After the drum has been run into the oven, a steam-connection is made at 12, thus admitting steam to the flattened pipe 13 inside of the drum. The steam escapes into the drum through numerous holes 14 in the pipe, said holes becoming more frequent in proportion to the drop in pressure as the steam advances. By means of the gears 9 and 10 the cage containing the drum is rotated slowly during the heating. Rotation is permitted by the stuffing box 12$^a$, which at the same time maintains the steam-connection. The arrangement of the piping shown is as follows: 15$^a$, 15$^b$, 15$^c$, 15$^d$ and 15$^e$ are valves; 16 is a pressure gage. By opening valves 15$^b$, 15$^a$, and closing valves 15$^d$ and 15$^e$, the steam is by-passed around the drum. By closing the valves 15$^b$ and 15$^d$ and opening 15$^c$, the pressure in the drum may be brought to any desired point as shown by gage 16. To reduce the pressure in the drum valve 15$^c$ may be closed and valves 15$^d$ and 15$^a$ opened, whereby the pressure escapes into the atmosphere. Thus, by proper valve-manipulation, the conditions of pressure and temperature in the drum may be regulated and controlled absolutely within the desired limits. It will be understood that the oven is heated by any suitable or desired means,—as, for example, by gas. The lid 18 of the drum is clamped tightly closed, a suitable soft-metal gasket being provided to cause an air-tight connection, when the drum is in the horizontal position in its frame. In order that the heating may not unseal the lid, I prefer to make the drum of bronze, or some material having a higher coefficient of expansion than the side members of the frame.

To remove the drum from the oven after the heating, valve 15$^c$ is closed, the drum is disconnected at 12, and is run out of the oven to a raising and lowering mechanism suitably connected with the drum through the arm 17. By means of this mechanism the drum is lowered about the shaft 4 as a pivot, as indicated in dotted lines in Fig. 3. The lid 18, previously held shut by the roller 19, suddenly flies open from internal pressure, if pressure there be, and the contents are discharged, assisted by gravity. In charging, the drum is raised by the same arm or screw 17 until it tilts upwardly, when the material to be treated may be fed into the drum.

By means of the apparatus just described, which is preferred for commercial purposes, it is convenient and practicable to subject the material in the drum or cylinder to any degree of heat or pressure, as well as to the desired agitation or tumbling action.

Of course, it will be understood that any suitable apparatus may be employed for carrying out my process, one complete apparatus capable of performing the same being shown, described and claimed in my co-pending application Serial No. 329,030, filed August 3, 1906. The apparatus shown and described in my application Serial No. 397,324, filed Oct. 14, 1907, likewise may be employed. It is also to be understood that variations may be made in the specific steps of my process and the manner of carrying the same into effect without affecting the general results obtained and without overstepping the bounds of my invention, and that specific variations may be made therein to accomplish specifically different results or in the treatment of different materials, and still be within the broad scope of my invention. So, too, in the case of the product, specific variations may occur therein, but ordinarily with corresponding absence of some of the advantageous characteristics of the preferred form, without departing from the broad scope or principle of the invention.

Referring particularly to the treatment of starch: the preferred manner of carrying out my improved process for commercial purposes, in connection with the apparatus shown and described in the drawings, is the following: Into the rotatable cylinder or drum, to fill the same about two-thirds, is placed a sufficient amount of starch containing about 15 to 25% of moisture, the starch being preferably in what may properly be termed a comminuted form,—that is to say, in powdered form, or in the form of small lumps or powder mixed with small lumps, as in pearl starch. The drum is then sealed air-tight by closing and clamping the lid in place as hereinbefore described, and is heated by any suitable source of heat such as the oven, indicated in the drawing, the temperature of the drum being raised to about 150° to 200° C. At the same time the drum is slowly rotated, whereby the starch is more evenly heated. When the temperature of the starch has reached about 70 to 80 degrees C., the starch in the presence of its moisture begins to gelatinize and become sticky. In tumbling, the starch-granules of powder begin to stick together to form nuclei or centers which, in rolling, grow in size by the accretion of other granules. This is true also of small lumps in the material, as in pearl starch, since such lumps as are not broken up by the initial tumbling also become sticky and form nuclei or centers. Lump starches of all kinds contain considerable powder and in the rotation of the drum they often are completely reduced to powder or are ground down into pebbles; and this is especially true when the starch contains more moisture than in the air-dry condition. As soon as the temperature becomes sufficient for the steam to form out of the moisture of the starch, a condensation of steam takes place on and throughout the material, thus, increasing the formation of adhesive nuclei or centers. This condensation is due to the fact that the temperature of the steam-atmosphere within the drum is naturally higher than that of the starch; and, of course, the temperature of the oven and of the drum-walls is likewise higher. If the drum is cold when the process is started, the heating is continued for about one hour or longer, while, when commencing with a hot drum or cylinder, a slightly shorter time is necessary. In both cases the heating results in the production within the drum of a pressure of about 30 to 50 pounds per square inch, the temperature of the starch at this pressure being about 130 to 150 degrees C. At this pressure the atmosphere within the drum approaches saturation, and substantially all of the material has been formed into pebble-like lumps. The pressure is now slowly reduced, as by blowing off until it falls to zero; this being accomplished in the particular apparatus illustrated in the drawing by the means hereinbefore described. The blowing off preferably should not be too slow, as it might cause the starch to dry out too much; nor too fast, as this might tend to break the lumps. I have found that first partly opening an ordinary valve, and then opening the same fully, allowing about five minutes for the complete operation, is about right. During the blowing off, the drum or receptacle may, if desired, be kept in rotation. This tends to expose as far as possible the whole surface of the starch lumps for drying out and becoming deodorized. It has been found that the blowing off of the pressure rids the starch of its corn-odor (when corn starch is used), as well as any other deleterious odors due to oils, etc., which are present in the starch and are volatile at the temperature of the starch at the pressure given.

The process may also be carried out in the absence of extreme pressure, i. e., with the valve left open to allow the confined air and the steam to escape slowly. During this treatment, the starch tends to dry out more quickly than when the valve is closed and the steam confined. It is desirable, therefore, that the starch contain the higher percentage of moisture. The temperature of the drum during this operation is raised to about 200° C., or higher. During this treatment, the starch gives off its moisture slowly in the form of steam and the air is quickly driven out so that the starch is surrounded by an atmosphere of steam under slight tension owing to the comparatively small blow-off opening. This steam condenses on the tumbling starch, and the multitude of nuclei or centers formed as before described gather up the loose powder and start the pebbles or balls, the operation being continued until the loose powder is all taken up or gathered up into the pebbled lumps. Upon the removal of the product from the drum it is ready for use as before.

The treatment in all cases is preferably stopped as soon as all powder has been gathered up by the pebbling lumps and as soon as a sufficient shell-like surface has formed on the lumps. This can be determined by the pressure and temperature of the starch under treatment, in the particular carrying-out of the process herein described, the pressure and temperature should be about as given. It is apparent that if the treatment be carried too far, the pebbles are liable to harden to such an extent as not to readily dissolve or break down when placed in water, as hereinafter described; and, if not carried far enough, for example, not up to the desired pressure, the pebbles may not be hard enough to stand handling without crumbling.

The product thus obtained consists entirely of lumps in the characteristic ball of pebble-like form free from loose powder. The pebbles have more or less a hardened periphery resembling a crust or shell, which prevents them from readily crumbling and pulverizing, and enables them to be readily handled and poured from one receptacle to another without producing powdered starch. The product is thus clean because there is no loose powder to collect dust and impurities. And if foreign matter does become mixed therewith, it may be readily separated. Also, in my new product, as thus made, the starch is in a semi-cooked, that is, semi-gelatinized condition. On which account when it is boiled with water to be prepared for laundry use, it makes a thinner starch than ordinary starch, and approaching in this respect the starches known as "thin-boiling" starches. In case it is desired to use the product exclusively for "thin-boiling" starch, the acid customarily used in the preparation of such starches may be added to the mixture before subjecting it to the pebbling treatment. Likewise, when desired, the usual amount of borax, paraffin, bluing, or the like, may be mixed with the starch—as, in making starch exclusively for laundry purposes; though for general use and purposes the pure starch is preferred. The pebble lumps are readily soluble, i. e., are readily broken down or dissolved when placed in cold or warm water, since they are of a size desirable therefor. The partly gelatinized surface of the starch-granules, which acts as a binder as long as the lumps are dry, is dissolved when in contact with water, thus separating the granules from each other and breaking the whole lump down,—that is, causing it to dissolve. It is apparent that this would not take place in boiling water which would tend to gelatinize the whole lump without breaking it down. When so dissolved in cold or warm water, the starch remains in suspension for a comparatively long time; and after having been once precipitated from the water, it may again be quickly stirred up to form an emulsion which is substantially the same as when freshly made. By the term "soluble" as here used, is meant that the starch-lumps break down when placed in cold or warm water, becoming soluble in the same sense as this term is used in describing starch either in its raw or in a semi-gelatinized condition when mixed with water. In such solutions, the individual starch granules remain suspended in the water for a longer or shorter time but finally settle to the bottom of the vessel. Furthermore, my new lump product produced as before described, is deodorized from all, or substantially all, deleterious odors, such as ordinarily exist in starches, especially corn starches.

The product above mentioned when it contains sufficient moisture,—say, about 15 to 25%, may be further treated for puffing according to the process set forth in my co-pending application, filed August 31, 1906, Serial No. 332,805. The puffing referred to may be accomplished in the apparatus shown and described herein, and in that more fully illustrated and described in my application Serial No. 329,030 filed August 3, 1906.

While I have spoken of gathering up all of the powder into the lumps it is apparent that, if desired, the product may contain loose powder either by stopping the process short of completion, or by adding the powder after completion of the pebbling. And further, it is apparent that if it be desired to add material to the charge in the drum for any purpose, for instance, to increase the size of the pebbles, the process may be interrupted for that purpose without harmful results. The process may be stopped before all the powder is gathered up, and then, after the material is taken from the drum, the powder may be sifted out, whereby the pebbles remaining become free from loose powder in accordance with the preferred conditions of the product. Any such loose powder sifted out may be again treated for pebbling, either by itself or mixed with other untreated material.

Inasmuch as it is not necessary to have the drum air-tight during the treatment of the starch, as hereinbefore fully explained, I would have it understood that by the term "closed receptacle" as used in some of the appended claims, I mean a receptacle which may or may not be closed air-tight, according as it is desired to carry out the process with or without extreme pressure in the receptacle,—all as previously set forth.

Having thus described my invention, what I claim as new and desire to secure by Letters Patent, is:

1. The process of treating material consisting of or predominating in starch and in a comminuted state, as powder or small lumps, which consists in heating such material containing some moisture to a temperature sufficient with the moisture present to produce gelatinization of the starch in the mass, and subjecting the mass to a tumbling action which is continued until the mass is formed into pebble-like lumps.

2. The process of treating material consisting of or predominating in starch and in a comminuted state, which consists in heating such material containing some moisture to a temperature sufficient with the moisture present to produce in the material sticky centers, and subjecting the mass to a tumbling action which is continued until the centers have in rolling about gathered up the loose material into lumps.

3. The process of treating material consisting of or predominating in starch and in a comminuted state, which consists in heating such material containing some moisture to the point where gelatinization of the starch begins, whereby gelatinized centers are formed, and subjecting the mass to a tumbling action which is continued until the centers have gathered up loose material and grown by accretion into lumps.

4. The process of treating material consisting of or predominating in starch and in a comminuted condition, which consists in heating and subjecting to a tumbling action the comminuted moisture-containing material until under the action of the heat with the moisture present adhesive nuclei or centers are formed which, under the continued tumbling action, gather up the loose material into lumps.

5. The process of treating material consisting of or predominating in starch and in a comminuted condition, which consists in heating and subjecting to a tumbling action the comminuted moisture-containing material until under the action of the heat with the moisture present the granules begin to gelatinize, whereby they form adhesive nuclei or centers, the tumbling action being continued and causing the nuclei or centers to gather up the loose material into lumps.

6. The process of pebbling material consisting of or predominating in starch and in a comminuted state, which consists in conjointly heating and subjecting to a tumbling action the comminuted moisture-containing material in a closed receptacle, the heating being continued until a steam-atmosphere has developed within the receptacle whereby a condensation of steam takes place on and throughout the material to cause adhesive nuclei or centers to form out of the same and which under the tumbling action gather up the loose material into pebble-like lumps.

7. The process disclosed, which consists in heating and tumbling material consisting of or predominating in starch in a comminuted form and containing some moisture in a closed receptacle until, under the action of the heat and moisture, gelatinized centers are formed from the starch, then continuing the heating until steam pressure develops within the receptacle to increase the adhesiveness of the mass, and continuing the tumbling action until the centers have gathered up the loose material and grown by accretion into lumps, and then slowly reducing the pressure, whereby the starch becomes deodorized.

8. The process disclosed which consists in tumbling starch in a comminuted form and containing about 15 to 25 per cent. moisture and conjointly heating the material in a closed receptacle to a temperature sufficient to start gelatinization, whereby adhesive nuclei or centers are formed which, due to the tumbling action, roll about and gather up the loose material so as to form lumps.

9. The process disclosed which consists in heating starch in a comminuted form and containing about 15 to 25 per cent. moisture, meanwhile subjecting the same to a tumbling action, the heat being sufficient to gelatinize some of the granules whereby they form adhesive nuclei or centers which, due to the tumbling action, are caused to gather up the loose material into lump form.

10. The process disclosed which consists in heating starch in a comminuted form and containing about 15 to 25 per cent. moisture in a closed receptacle until a steam-atmosphere has developed within the receptacle, whereby a condensation of steam takes place on and throughout the material to develop out of the same adhesive nuclei or centers, which, due to the tumbling action, are caused to gather up the loose material into pebble-like lumps.

11. The process disclosed which consists in heating and tumbling starch or material predominating in starch in a comminuted form and containing about 15 to 25 per cent. moisture in a closed receptacle until, under the action of the heat and moisture, adhesive nuclei or centers are formed from the starch, then continuing the heating and tumbling until a pressure develops within the receptacle to increase the adhesiveness of the material and to cause the nuclei or centers in rolling about, under the tumbling action, to grow by accretion into lumps, and then slowly reducing the pressure.

12. The process of pebbling starch which consists in heating and tumbling comminuted starch containing about 15 to 25 per cent. moisture in a closed receptacle until a steam-atmosphere has developed therein, whereby a condensation of steam takes place on and throughout the material to bring about gelatinization and form adhesive nuclei or centers out of the starch, then continuing the heating and tumbling until a pressure of about 30 to 50 pounds per square inch has developed within the receptacle to increase the adhesiveness of the mass, whereby, due to the tumbling action, substantially all of the loose material is gathered up by the nuclei or centers into pebble-like lumps, and then slowly reducing the pressure, whereby the lumps of starch become deodorized.

13. An article of manufacture consisting of rounded lumps of starch-containing material showing a formation by accretion, and having a smooth surface.

14. An article of manufacture consisting of ball or pebble-like lumps of starch-containing material consisting of concentric like layers showing a formation by accretion.

15. An article of manufacture consisting of compact ball-like or rounded lumps of partially gelatinized starch having a smooth crust-like exterior and which readily break down in cold or warm water to form a starch milk.

16. As an article of manufacture, a lump-starch consisting of pebble-like lumps showing a formation by accretion and provided with a crust-like exterior.

17. As an article of manufacture, a lump-starch consisting of pebble-like deodorized lumps having a smooth rounded surface and which readily break down and are soluble in cold or warm water.

18. As an article of manufacture, a deodorized lump-starch consisting of pebble-like lumps formed by accretion.

In witness whereof, I have hereunto subscribed my name in the presence of two witnesses.

ALEXANDER P. ANDERSON.

Witnesses:
J. JAY SMITH,
JAMES RIDEOUT.